(12) United States Patent
Brandt et al.

(10) Patent No.: US 6,459,445 B1
(45) Date of Patent: Oct. 1, 2002

(54) STRAY LIGHT BAFFLE FOR INTERNAL DRUM SCANNER

(75) Inventors: Michael B. Brandt, Walworth; Amy L. Zelazny, Webster; Michael P. Urbon, Churchville, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/721,317

(22) Filed: Nov. 22, 2000

(51) Int. Cl.[7] ................................................. B41J 27/00
(52) U.S. Cl. ...................................... 347/256; 347/241
(58) Field of Search ............................... 347/241, 242, 347/243, 256, 258, 259, 257, 255, 244; 359/710, 727

(56) References Cited

U.S. PATENT DOCUMENTS 5,883,658 A    3/1999   Schubert et al. ............ 347/258

*Primary Examiner*—Hai Pham
(74) *Attorney, Agent, or Firm*—William F. Noval

(57) ABSTRACT

An optical scanner assembly exposes an image on photosensitive media positioned on the internal surface of a drum platen. The assembly includes: a laser assembly for producing a laser beam representative of the image to be exposed on photosensitive media; a semi-circular flexible lens curved to the shape of the photosensitive media positioned on the internal surface of the drum platen, the lens having a plano-convex cylinder lens having a convex side facing the media; a laser beam scanner positioned between the laser assembly and the lens to scan the laser beam through the lens across the media in an image-wide pattern; and a baffle located between the scanner and the lens for extinguishing laser beam reflections from the convex side of the lens.

3 Claims, 4 Drawing Sheets

STRAY LIGHT BAFFLE FOR INTERNAL DRUM SCANNER

FIELD OF THE INVENTION

This invention relates in general to internal drum scanner assemblies and laser imaging systems incorporating such scanner assemblies. In particular, the present invention relates to a baffle for extinguishing second surface reflections in an optical scanner assembly having a lens located between the scanner and photosensitive media.

BACKGROUND OF THE INVENTION

Laser imaging systems are commonly used to produce photographic images from digital image data generated by magnetic resonance (MR), computed tomography (CT) or other types of medical image scanners. Systems of this type typically include a continuous tone laser imager for exposing the image on photosensitive film, a film processor for developing the film, and control subsystems for coordinating the operation of the laser imager and the film processor.

The digital image data is a sequence of digital image values representative of the scanned image. Image processing electronics within the control subsystem processes the image data values to generate a sequence of digital laser drive values (i.e., exposure values), which are input to a laser scanner. The laser scanner is responsive to the digital laser drive values for scanning across the photosensitive film in a raster pattern for exposing the image on the film.

The continuous-tone images used in the medical imaging field have very stringent image-quality requirements. A laser imager printing onto transparency film exposes an image in a raster format, the line spacing of which must be controlled to better than one micrometer. In addition, the image must be uniformly exposed such that the observer cannot notice any artifacts. In the case of medical imaging, the observers are professional image analysts (e.g., radiologists).

Film exposure systems are used to provide exposure of the image on photosensitive film. Known film exposure systems include a linear translation system and a laser or optical scanning system. The laser scanning system includes a laser scanner with unique optical configurations (i.e., lenses and mirrors) for exposure of the image onto the film. The linear translation system provides for movement of the laser scanning system in a direction perpendicular to the scanning direction, such that a full image may be scanned on a piece of photosensitive film.

U.S. Pat. No. 5,883,658, issued Mar. 16, 1999, inventors Schubert et al. discloses an optical scanner assembly for exposing an image on a photosensitive media. The media is positioned on the internal surface of a drum platen. The optical scanner assembly includes a laser assembly for producing a laser beam representative of the image to be exposed on the photosensitive media, a scanner, and a long, flexible lens curved to the semi-circular shape of the media positioned on the internal surface of the drum platen, the lens being positioned between the scanner and the film. This scanner operates to scan the laser beam across the media in an image-wide pattern. The lens is plano-convex with the convex side facing the film. The lens is tilted from a perpendicular position relative to the laser beam axis.

It has been found that laser beam reflections from the highly divergent surfaces of the convex lens propagate backwards to the media on the opposite side causing undesirable exposures and creating visually objectionable image artifacts in the media. There is thus a need to eliminate these undesirable reflections.

SUMMARY OF THE INVENTION

According to the present invention, there is provided a solution to the problems discussed above.

According to a feature of the present invention, there is provided an optical scanner assembly for exposing an image on photosensitive media positioned on the internal surface of a drum platen, the assembly comprising: a laser assembly for producing a laser beam representative of the image to be exposed on photosensitive media; a laser beam scanner positioned between said laser assembly and said media to scan said laser beam through the lens across the media in an image-wide pattern; and a baffle located between said scanner and said media for extinguishing laser beam reflections from said lens.

ADVANTAGEOUS EFFECT OF THE INVENTION

The invention has the following advantages.

1. Laser beam reflections in an internal drum laser scanner assembly are extinguished to eliminate undesirable exposures and visually objectionable image artifacts in exposed media.

DETAILED DESCRIPTION OF THE INVENTION

Figure 1:
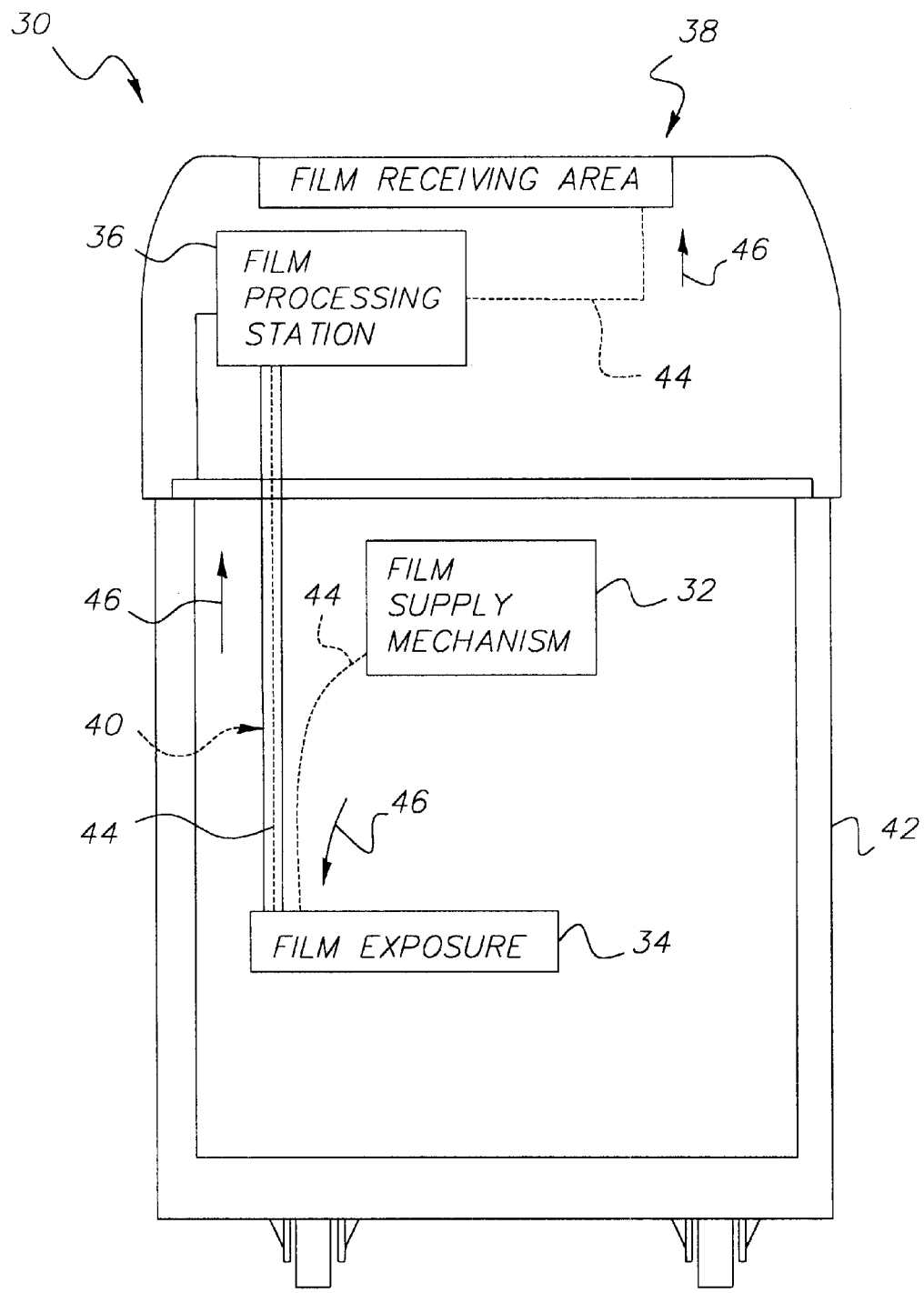
FIG. 1 is a diagrammatic elevational view of a laser imaging system including the present invention.

FIG. 1 is an elevational diagram illustrating an exemplary embodiment of a laser imaging system 30 suitable for use in the medical imaging industry including a film exposure assembly having a laser scanning assembly in accordance with the present invention. The imaging system 30 includes a film supply mechanism 32, a film exposure assembly 34, a film processing station 36, a film receiving area 38, and a film transport system 40. The film supply mechanism 32, film exposure assembly 34, film processing station 36, and film transport system 40 are all located within an imaging system housing 42.

Photosensitive film is stored within the film supply mechanism 32. The film transport system 40 allows the photosensitive film to be moved between the film exposure assembly 34, film processing station 36, and the film receiving area 38. The film transport system 40 may include a roller system (not shown) to aid in transporting the film along a film transport path, indicated by dashed line 44. The direction of film transport along film transport path 44 is indicated by arrows 46. In particular, the film supply mechanism 32 includes a mechanism for feeding a piece of film along film transport path 44 into the film exposure assembly 34 for exposing the desired image on the photosensitive film using a laser or optical scanner assembly. After exposure of the desired image on the photosensitive film, the photosensitive film is moved along the film transport path 44 to the film processing station 36. The film processing station 36 develops the image on the photosensitive film. After film development, the photosensitive film is transported to the film receiving area 38.

Figure 2:
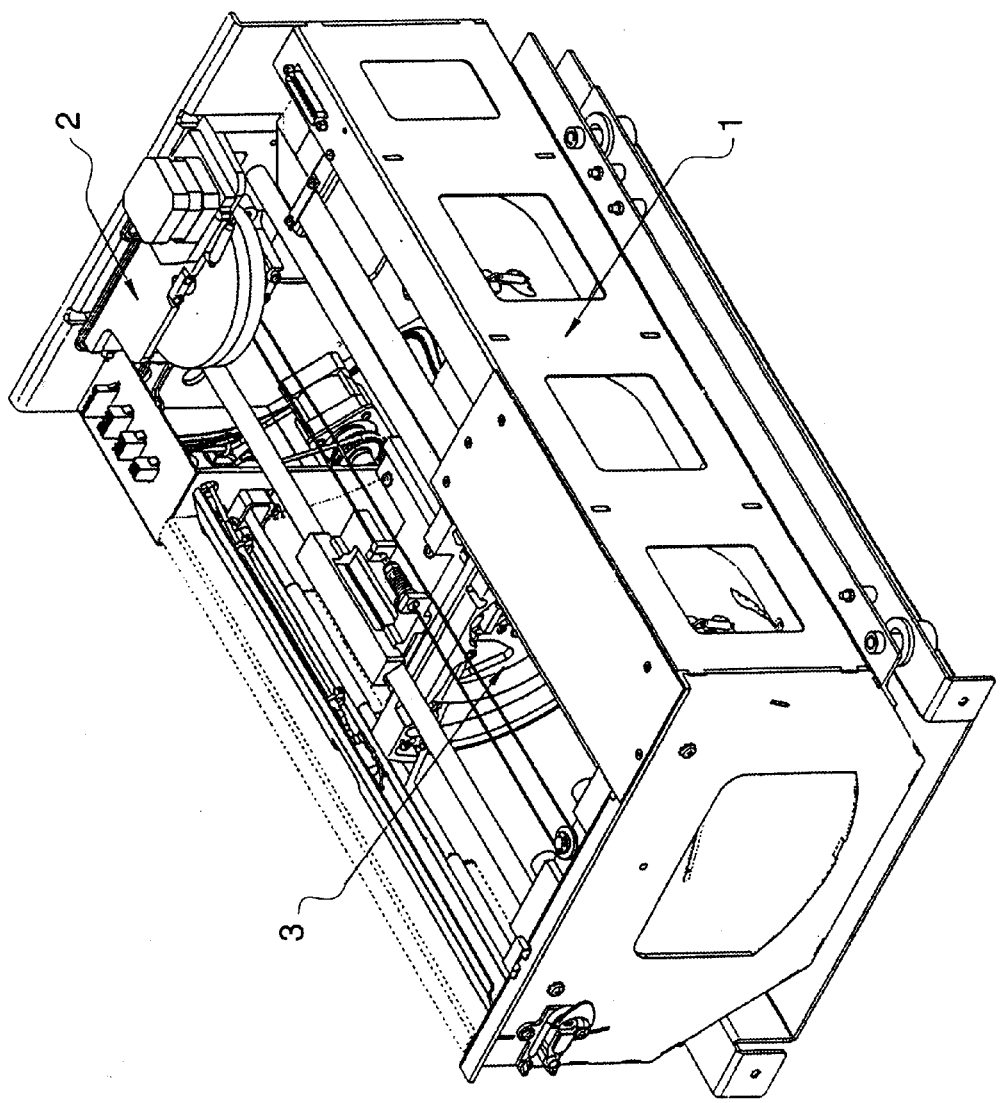
FIG. 2 is a perspective view of an exemplary media exposure assembly incorporating the present invention.

FIG. 2 depicts a type of a film exposure assembly referred to as an "internal drum" scanner configuration. Arrow 1 points to the mechanical structure inside of which is a section of a cylinder known as the platen. The platen holds the media being scanned in a cylindrical shape. Arrow 2 points to a motorized slow scan assembly. This assembly consists of a drive motor, flywheel assembly, precision guide rails, and cables. The assembly is used to translate the optical scanner assembly along the media. Arrow 3 points to a motorized optical scanner assembly. This assembly angularly sweeps a laser beam, in a radial direction, nearly perpendicular to the axis of the platen, at a high rate of speed. This assembly is sometime referred to as the "fast scan" assembly. This invention is more closely associated with item number 3, the optical scanner (fast scan) assembly, and more particularly, an internal drum scan engine in which the optical scan angle approaches or exceeds 180 degrees.

Figure 3:
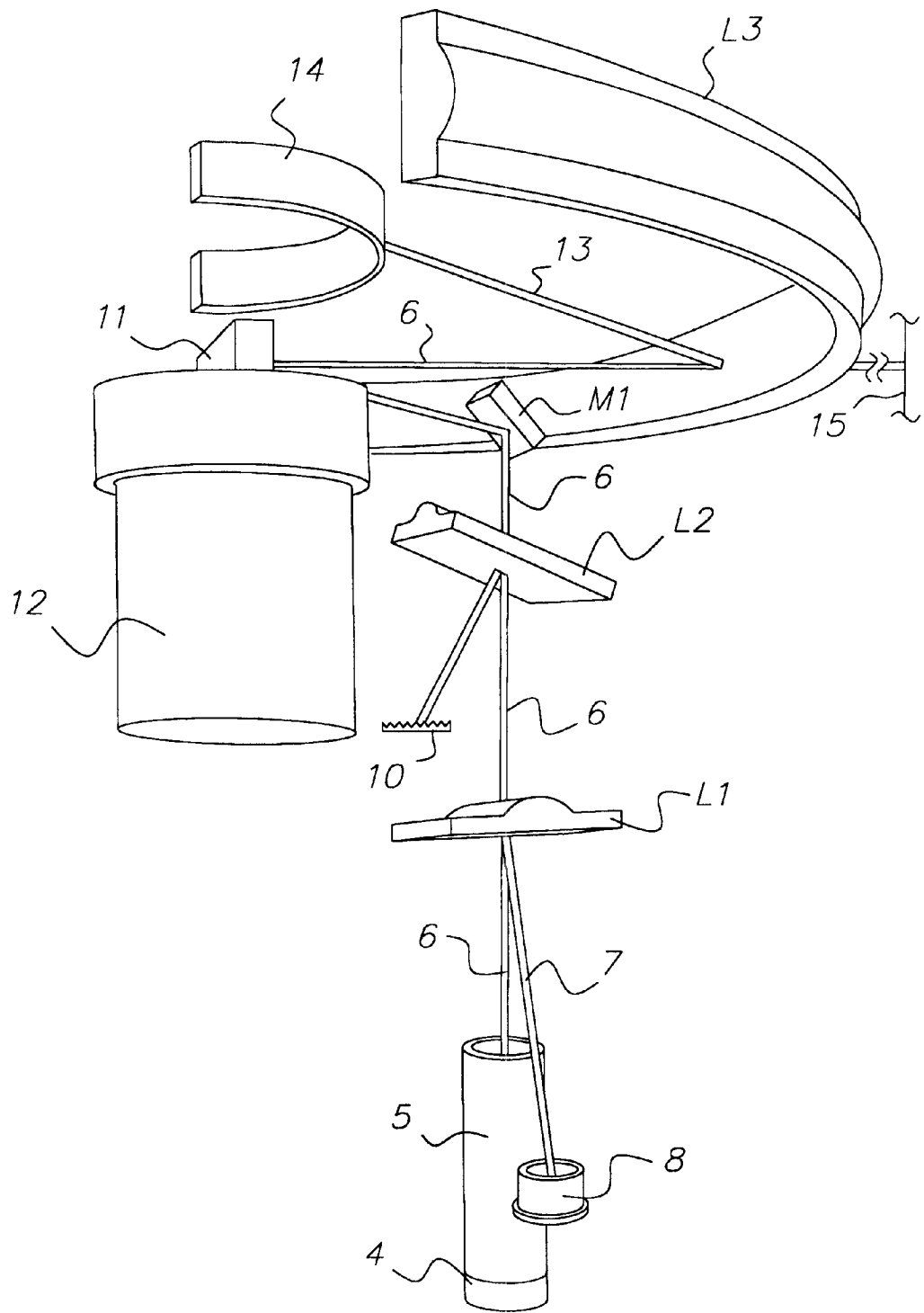
FIG. 3 is a perspective view of an optical scanner assembly including the present invention.

FIG. 3 shows a modification of an internal drum scanner assembly as described in U.S. Pat. No. 5,883,658, issued Mar. 16, 1999, inventors Schubert and Li. Laser diode 4 emits a laser beam that is collimated by collimator lens 5. The laser beam 6 is directed towards the first beam shaping lens L1. Beam shaping lens L1 is tilted slightly such that the reflected component 7 can be used to provide a feedback signal to feedback sensor 8. The transmitted portion of the laser beam 6 is further directed towards beam shaping lens L2. Beam shaping lens L2 is tilted slightly such that the reflected component 9 can be directed to an absorption surface 10 thereby preventing undesirable effects. The transmitted portion of the laser beam 6 is then directed toward a fold mirror M1. Fold mirror M1 reflects the laser beam toward a rotating or oscillating scanner mirror 11. The direction of the reflected laser beam is slightly inclined to the plane of scan in order to prevent the fold mirror M1 from obstructing the scanned laser beam 6. Scanner mirror 11 is moved in an angular fashion by scanner motor 12. The scanned laser beam 6 is then directed towards flexible lens L3. Lens L3 is shown having a plano-convex portion facing the media It will be understood that any curvature, perpendicular to the plane of seam either convex or concave on any lens surface, can cause undesirable reflections which are mitigated by the present invention. The reflected component 13 of the scanned laser beam 6 is directed upwards toward an absorption surface 14 (the gist of this disclosure). Lastly, the transmitted portion of the scanned laser beam continues on its path toward the media 15.

Figure 4:
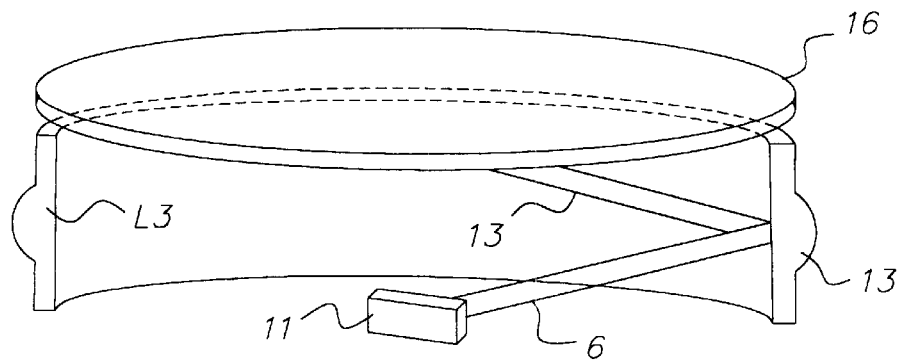
FIGS. 4, 5 and 6 are diagrammatic views useful in explaining the present invention.

As shown in FIG. 4, a flat blackened cover 16, functions as a light trap, to extinguish certain reflections from flexible lens L3. This functionality does exist for first surface reflections from flexible lens L3 because the laser beam 6 possesses a relatively large F-number, the first surface of flexible lens L3 possesses little or very weak curvature and the laser beam 6 is sufficiently inclined relative to the plane of the scanner motor 12. However, the light trap functionality does not exist for second surface reflections.

Figure 5:
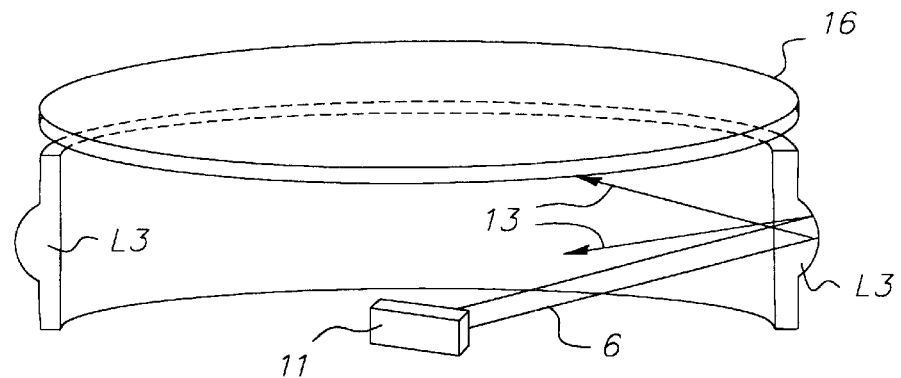

As shown in FIG. 5, the blackened cover 16 was found not to be effective at extinguishing reflections from the second surface of flexible lens L3, due to the highly divergent nature of the reflected laser beam 13 caused by the strong curvature of this convex second surface. Reflections from this second surface were found to propagate backward, over the top of scanner mirror 11, and pass through the flexible lens L3 at approximately 180 degrees opposite the location of their initial incidence on flexible lens L3. The second surface reflections continued propagating on their path toward the media 15 causing undesirable exposures and creating visually objectionable image artifacts.

In addition, (depending upon the reflectivity characteristics of the media 15, the apertures of the scan optics, the inclination angle of the scanned laser beam 6, etc.) the potential may exist for energy reflected from the media 15 to pass back through the scan optics, exit at approximately 180 degrees away, and strike the media causing undesirable exposures and creating visually objectionable image artifacts.

Figure 6:
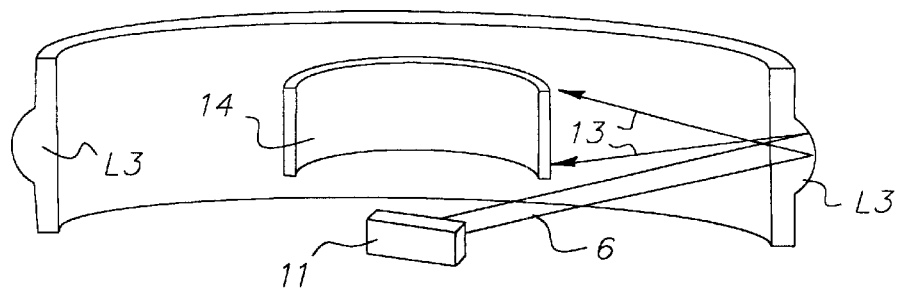

According to the present invention as shown in FIG. 6, the solution to the problem at hand was to create a light trap/barrier that would extinguish the second surface reflections and at the same time shadow the aperture of flexible lens L3 from these unwanted reflections. There are a number of geometrical shapes that may by used to create a light trap/barrier for this problem, but the functionality remains the same, extinguishing the reflections and shadow the lens aperture. The geometry is primarily driven by ease of manufacture and mounting robustness. In the present embodiment, we have chosen a circular cylindrical section geometry for absorption surface 14. A simple vertical wall could have also been located over the scanner mirror 11 to create the light trap/barrier. In our chosen geometry, the circular cross-section is concentric with the scanner motor 12 and the flexible lens L3. Given the inclination angle of the scanned beam 6, the effectiveness of this light trap/barrier is increased and mechanical tolerances are loosened by keeping its radius small and close to the scan mirror 11. For example, if the absorption surface 14 possessed a radius approaching the bend radius of the flexible lens L3, the size and position of the cylindrical section would expose a major portion of the flexible lens in order to allow room for the scanned beam to pass by without obstruction. By keeping this radius small, the length of the cylindrical section can be increased to completely shadow the aperture of the flexible lens without obstructing the scanned beam 6. The radius of the light trap/barrier must not be made excessively small. There is a limit. One must keep the radius large enough to accommodate the width and direction of the reflected beam 13 in the plane perpendicular to the page.

The invention has been described in detail with particular reference to certain preferred embodiments thereof, but it will be understood that variations and modifications can be effected within the spirit and scope of the invention.

PARTS LIST 1,2,3 arrows
4 laser diode
5 collimator lens
6 laser beam
7 reflected component
8 feedback sensor
9 reflected component
10 absorption surface
11 scanner mirror
12 scanner motor
13 reflected component
14 absorption surface
15 media
30 imaging system
32 film supply mechanism
34 film exposure assembly
36 film processing station
38 film receiving area

40 film transport system
42 imaging system housing
44 film transport path
46 arrows
L1 shaping lens
L3 beam shaping lens
L3 flexible lens
M1 fold mirror

What is claimed is:

1. An optical scanner assembly for exposing an image on photosensitive media positioned on the internal surface of a drum platen, the assembly comprising:

a laser assembly for producing a laser beam representative of the image to be exposed on photosensitive media;

a semi-circular flexible lens curved to the shape of the photosensitive media positioned on the internal surface of the drum platen, the lens being a plano-convex cylinder lens having a convex side facing said media;

a laser beam scanner positioned between said laser assembly and said lens to scan said laser beam through the lens across the media in an image-wide pattern; and a baffle located out of the said laser beam path between said scanner and said lens for extinguishing laser beam reflections from said convex side of said lens;

wherein said baffle has a semi-circular shape concentric with said flexible lens.

2. The optical scanner assembly of claim 1 wherein said lens has a curvature on any surface perpendicular to the plane of scan and wherein said baffle extinguishes reflections from said lens curvature.

3. The optical scanner assembly of claim 1 wherein said lens is tilted with respect to said scanned laser beam and said baffle is located above said scanner.

* * * * *